(12) United States Patent
Wu (10) Patent No.: US 8,429,314 B2
(45) Date of Patent: Apr. 23, 2013

(54) FIFO SYSTEM AND OPERATING METHOD THEREOF

(75) Inventor: Jin Xiao Wu, Banciau (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 13/237,737

(22) Filed: Sep. 20, 2011

(65) Prior Publication Data

US 2012/0011289 A1  Jan. 12, 2012

Related U.S. Application Data

(63) Continuation of application No. 11/385,545, filed on Mar. 21, 2006, now Pat. No. 8,046,506.

(51) Int. Cl.
*G06F 3/00* (2006.01)
*G06F 12/00* (2006.01)

(52) U.S. Cl.
USPC ............................................ 710/52; 711/103

(58) Field of Classification Search ...................... 710/52
See application file for complete search history.

(56) References Cited

U.S. PATENT DOCUMENTS

| | | | |
|---|---|---|---|
| 5,625,842 A | 4/1997 | Dalrymple | |
| 5,974,486 A * | 10/1999 | Siddappa | 710/53 |
| 6,131,135 A * | 10/2000 | Abramson et al. | 710/113 |
| 6,356,968 B1 | 3/2002 | Kishon | |
| 6,405,270 B1 | 6/2002 | Chen | |
| 6,477,607 B1 | 11/2002 | Jeong | |
| 6,484,218 B1 | 11/2002 | Pipho | |
| 6,753,903 B1 * | 6/2004 | Lin | 348/207.2 |
| 6,779,061 B1 * | 8/2004 | Swindle et al. | 710/71 |
| 6,792,501 B2 * | 9/2004 | Chen et al. | 711/103 |
| 6,913,196 B2 | 7/2005 | Morrow et al. | |

FOREIGN PATENT DOCUMENTS

| | | |
|---|---|---|
| CN | 1391227 | 1/2003 |
| TW | 238360 | 8/2005 |

OTHER PUBLICATIONS

PCT Search Report issued Feb. 8, 2007.

\* cited by examiner

*Primary Examiner* — Henry Tsai
*Assistant Examiner* — Titus Wong
(74) *Attorney, Agent, or Firm* — McClure, Qualey & Rodack, LLP (57) ABSTRACT

FIFO systems and operating method thereof are provided to transfer data between a first device and a second device. In the FIFO system, a memory controller serves as an interface to access a memory device for storage of the data, and a CPU processes instructions to control the data transfer. Two data FIFOs serve as data buffers for data transactions to and from the first and second devices, and two status FIFOs serve as an instruction buffers for status transactions between the first, second devices and the CPU. A data controller connects the memory controller and the two data FIFOs for direct data delivery therebetween.

7 Claims, 11 Drawing Sheets

FIFO SYSTEM AND OPERATING METHOD THEREOF

CROSS REFERENCE TO RELATED APPLICATIONS

This application is a Continuation of application Ser. No. 11/385,545, filed Mar. 21, 2006, now U.S. Pat. No. 8,046,506, the entirety of which is incorporated by reference herein.

BACKGROUND OF THE INVENTION

1. Field of the Invention

The invention relates to FIFO devices, and in particular, to a FIFO sharing mechanism for data reproduction.

2. Description of the Related Art

Figure 1:
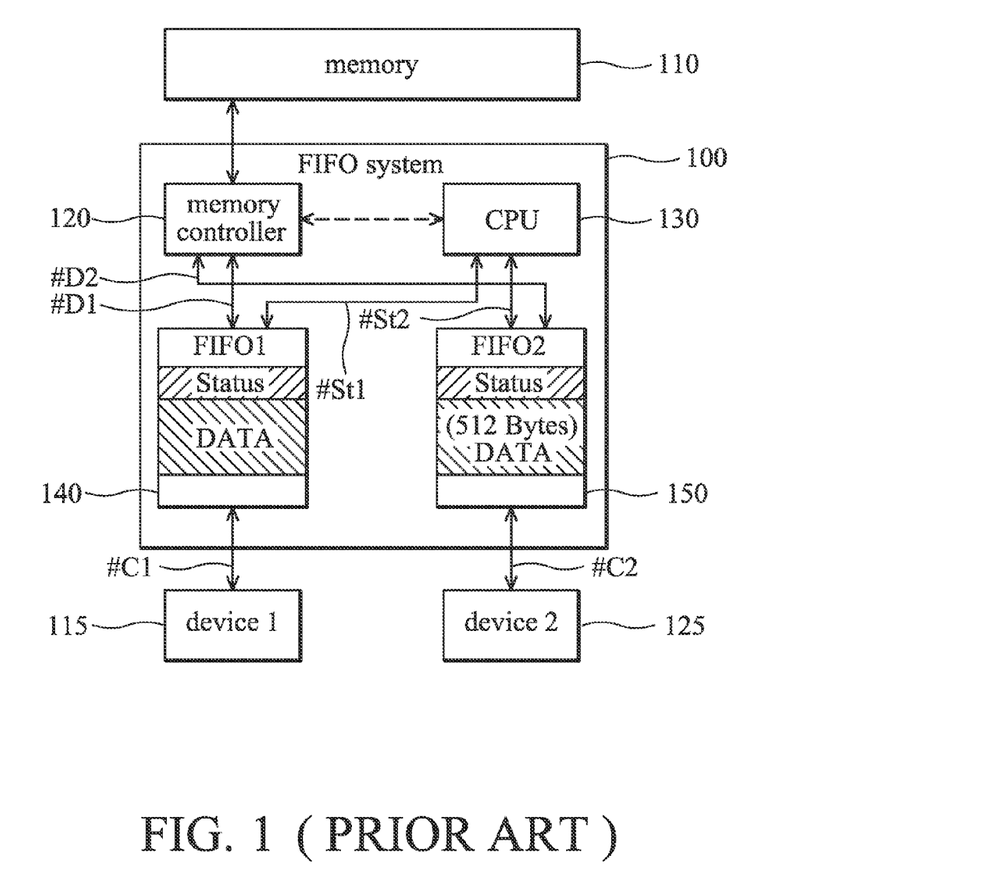
FIG. 1 shows a conventional FIFO system 100 coupled to a first device 115 and a second device 125.

FIG. 1 shows a conventional FIFO system 100 coupled to a first device 115 and a second device 125. The FIFO system 100 comprises a memory controller 120, a CPU 130, a first FIFO device 140 and a second FIFO device 150. The memory controller 120 is controlled by the CPU 130 to access a memory device 110. The first FIFO device 140 serves as an interface for instruction transfer to and from the first device 115, and the second FIFO device 150 for second device 125. The instructions transferred via the first FIFO device 140 and second FIFO device 150, comprise two types, status and data. Status instructions delivered from the first device 115 or second device 125 are parsed and executed by the CPU 130, and data instructions from the first device 115 and second device 125 are sent to the memory device by the memory controller 120. Thus, each of the devices 115 and 125 is simultaneously coupled to the memory controller 120 and CPU 130, with a detection mechanism required determining instruction types stored therein, such that the instructions can be directed accordingly.

Figure 2A:
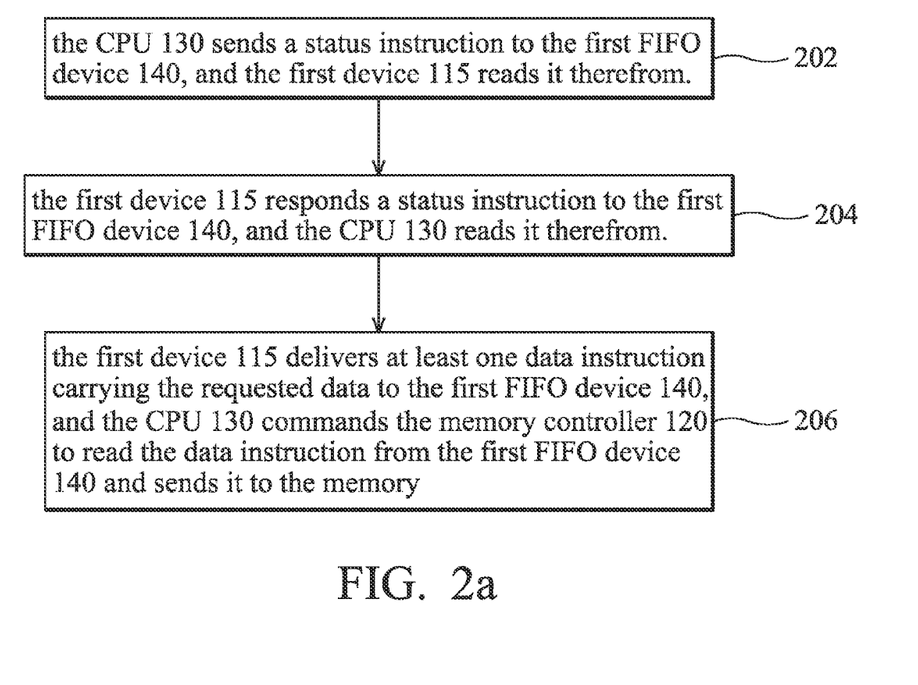
FIG. 2a is a flowchart of a conventional data reading process.

FIG. 2a is a flowchart of a conventional data reading process. In step 202, when the FIFO system 100 requests data from first device 115, the CPU 130 initializes the transfer by sending a status instruction to the first FIFO device 140. The first device 115 then reads the status instruction from the first FIFO device 140, and performs an initialization to determine whether the requested data is available. In step 204, a status instruction is delivered from the first device 115 to the first FIFO device 140, indicating the availability of the requested data. Thereafter, the CPU 130 reads the status instruction in the first FIFO device 140. In step 206, if the requested data is available, the first device 115 delivers at least one data instruction carrying the requested data to the first FIFO device 140. Upon confirmation of the availability of the requested data according to the returned status instruction, the CPU 130 commands the memory controller 120 to read the data instruction from the first FIFO device 140 and sends it to the memory device.

Figure 2B:
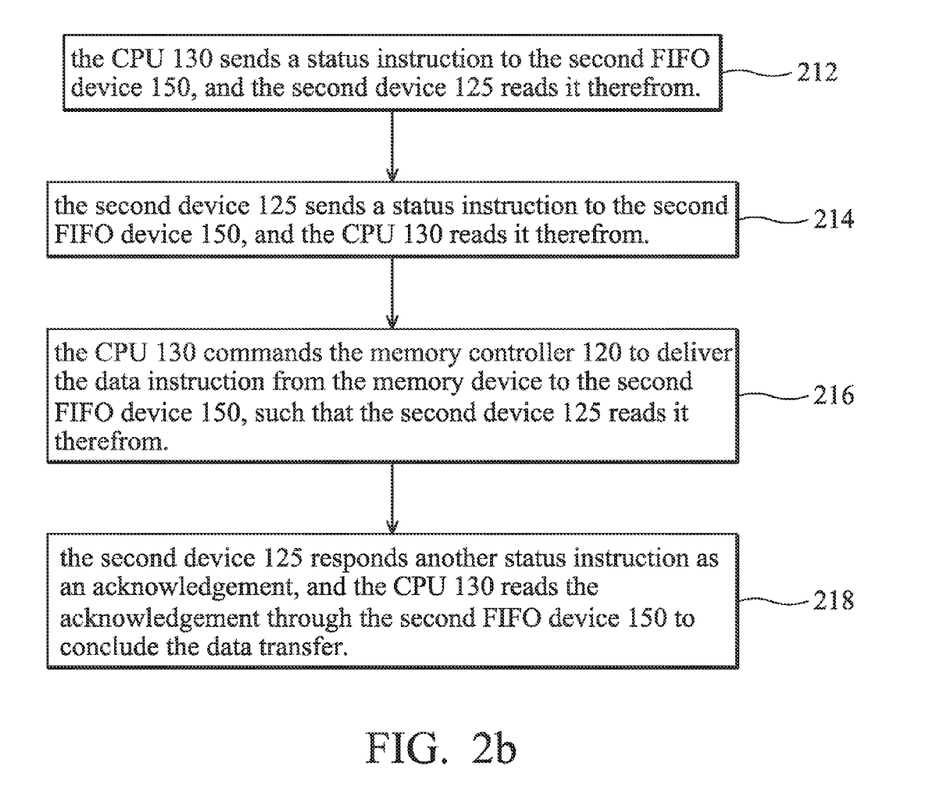
FIG. 2b is a flowchart of a conventional data writing process.

FIG. 2b is a flowchart of a conventional data writing process. In step 212, when the FIFO system 100 requests to write data from the memory device to the second device 125, the CPU 130 initializes the transfer by sending a status instruction to the second FIFO device 150. The second device 125 then reads the status instruction from the second FIFO device 150, and performs an initialization to determine whether the second device 125 is capable of storing the data. In step 214, in response, a status instruction is delivered from the second device 125 to the second FIFO device 150, indicating the capability for storage. The CPU 130 reads the returned status instruction in the second FIFO device 150 to confirm the capability. In step 216, upon confirmation of the capability for data storage according to the returned status instruction, the CPU 130 commands the memory controller 120 to deliver the data instruction from the memory device to the second FIFO device 150. In step 218, when the second device 125 obtains the data instruction through the second FIFO device 150, it responds another status instruction as an acknowledgement. Through the second FIFO device 150, the CPU 130 reads the acknowledgement to conclude the data transfer.

The FIFO system 100 may be a card reader, whereas the first device 115 and second device 125 are memory cards such as SD or CF cards. When there is need to copy data from the first device 115 to the second device 125, or vice versa, the processes shown in FIGS. 2a and 2b are performed. The memory device and CPU 130 occupy significant system resources and time. Additionally, the determination of instruction type also consumes considerable computation power of the CPU 130. A more efficient architecture is thus desirable.

BRIEF SUMMARY OF THE INVENTION

A detailed description is given in the following embodiments with reference to the accompanying drawings.

A FIFO system is provided, transferring data between a first device and a second device, in which a memory controller serves as an interface to access a memory device for storage of the data, and CPU processes instructions to control the data transfer. The FIFO system may also comprise a first data FIFO serving as a data buffer for data transactions to and from the first device, a first status FIFO coupled to the first device and the CPU serving as an instruction buffer for status transactions between the first device and the CPU, a second data FIFO serving as a data buffer for data transactions to and from the second device, and a second status FIFO coupled to the second device and the CPU serving as an instruction buffer for status transactions between the second device and the CPU. A FIFO controller connects the first data FIFO and second data FIFO for direct data delivery therebetween.

In another embodiment, the two data FIFOs are merged to one, serving as a shared data buffer for data transactions to and from the first and second devices. A FIFO controller is further provided, coupled to the first status FIFO, second status FIFO and data FIFO, multiplexing data and status transactions to and from the first and second devices.

In a further embodiment, the two status FIFOs are also merged to one, serving as a shared instruction buffer for status transactions between the first device, second device and the CPU. Thus a FIFO controller is provided, coupled to the data FIFO and the status FIFO, multiplexing data and status transactions to and from the first and second devices.

The said first and second devices can be the same type or different type. The device type can be MS card, SD card, CF card, or any other device conforming IEEE 1394 or USB standards.

Embodiments of FIFO operating method implemented on the FIFO systems described are also provided.

BRIEF DESCRIPTION OF THE DRAWINGS

The invention can be more fully understood by reading the subsequent detailed description and examples with references made to the accompanying drawings, wherein:

FIG. 3b shows an embodiment of a FIFO controller 330 in the FIFO system 300 according to FIG. 3a;

FIG. 3c is a flowchart showing an embodiment of a data reproduction process according to the architecture in FIG. 3a;

FIG. 4b shows an embodiment of the FIFO controller 450 in the FIFO system 400 according to FIG. 4a;

FIG. 4c is a flowchart showing an embodiment of a data reproduction process according to the architecture in FIG. 4a;

FIG. 5b shows an embodiment of the FIFO controller 550 in the FIFO system 500 according to FIG. 5a.

DETAILED DESCRIPTION OF THE INVENTION

Figure 3A:
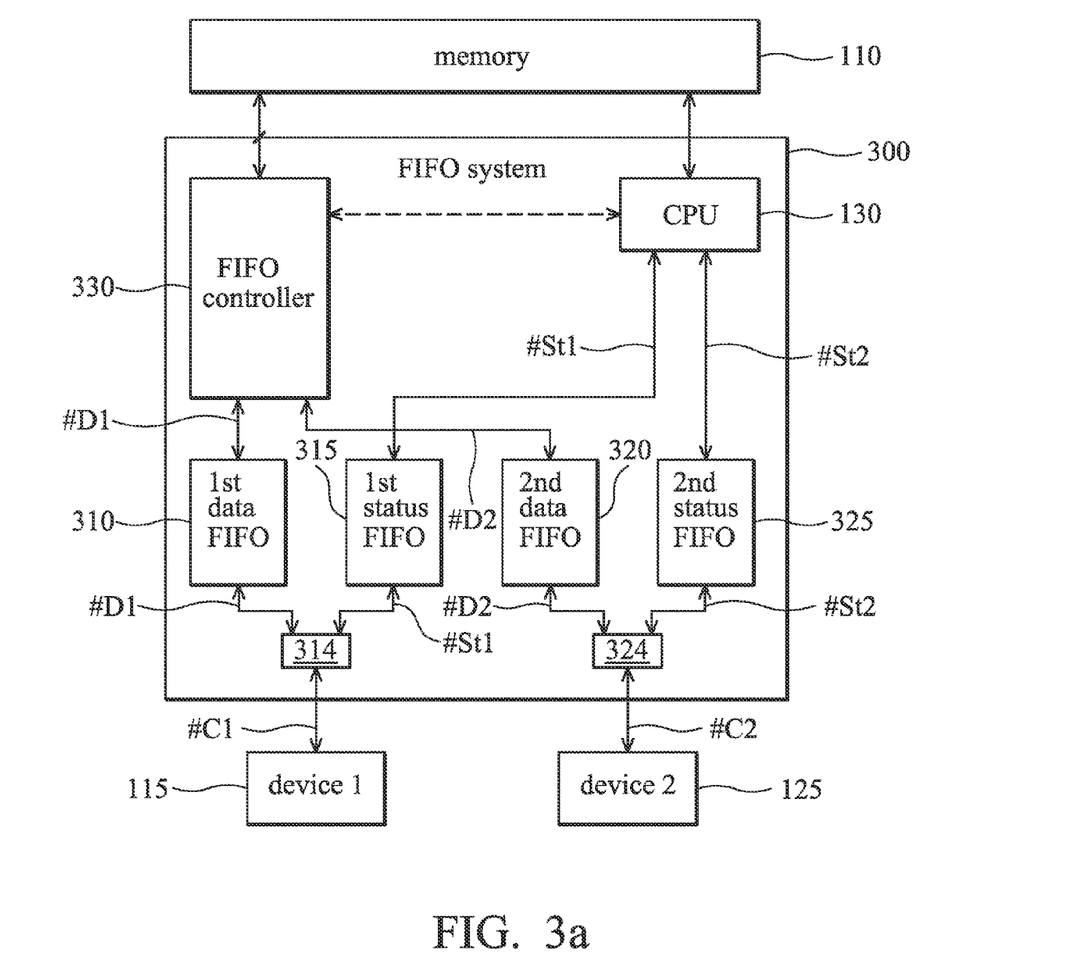
FIG. 3a shows an embodiment of a FIFO system 300 coupled to the first device 115 and second device 125.

FIG. 3a shows an embodiment of a FIFO system 300 coupled to the first device 115 and second device 125. The FIFO system 300 comprises a FIFO controller 330, a CPU 130, a first data FIFO 310, a first status FIFO 315, a second data FIFO 320, and a second status FIFO 325. The first data FIFO 310 and the first status FIFO 315 are interfaces for the first device 115, individually passing status and data instructions respectively, and the second data FIFO 320 and the second status FIFO 325 are for the second device 125. The two sets of interfaces are identical, so only that of the first device 115 is used for description. For example, instructions sent from the first device 115, are categorized in the arbitrator 314 according to instruction type, thus data instructions are sent to the first data FIFO 310, and status instructions to the first status FIFO 315. The FIFOs may be bidirectional, whereas instructions bound to the first device 115 are also provided to the first data FIFO 310 and first status FIFO 315, and the first device 115 reads them thereafter via the arbitrator 314. The arbitrator 314 is coupled to the first data FIFO 310 and first status FIFO 315, respectively diverting the data and status instructions from the first device 115 to the first data FIFO 310 and first status FIFO 315, and conversely from the first data FIFO 310 and first status FIFO 315 to the first device 115. The arbitrator 324 serves the same function for the second data FIFO 320, second status FIFO 325 and second device 125. Since the Status instructions are typically machine codes executing specific functions, handled by the CPU 130, no status interaction is required between the first device 115 and second device 125. With the CPU 130, status instructions are delivered to and from the first device 115 via the first status FIFO 315, and the second device 125 via the second status FIFO 325. In the FIFO controller 330, a data controller 350 is provided to dominate data instruction flow. Specifically, the data controller 350 handles data instruction delivery between any two of the first data FIFO 310, second data FIFO 320 and memory controller 120. The FIFO controller 330 also comprises a memory controller 120 controlled by the CPU 130 to handle memory access of the memory device 110.

Figure 3B:
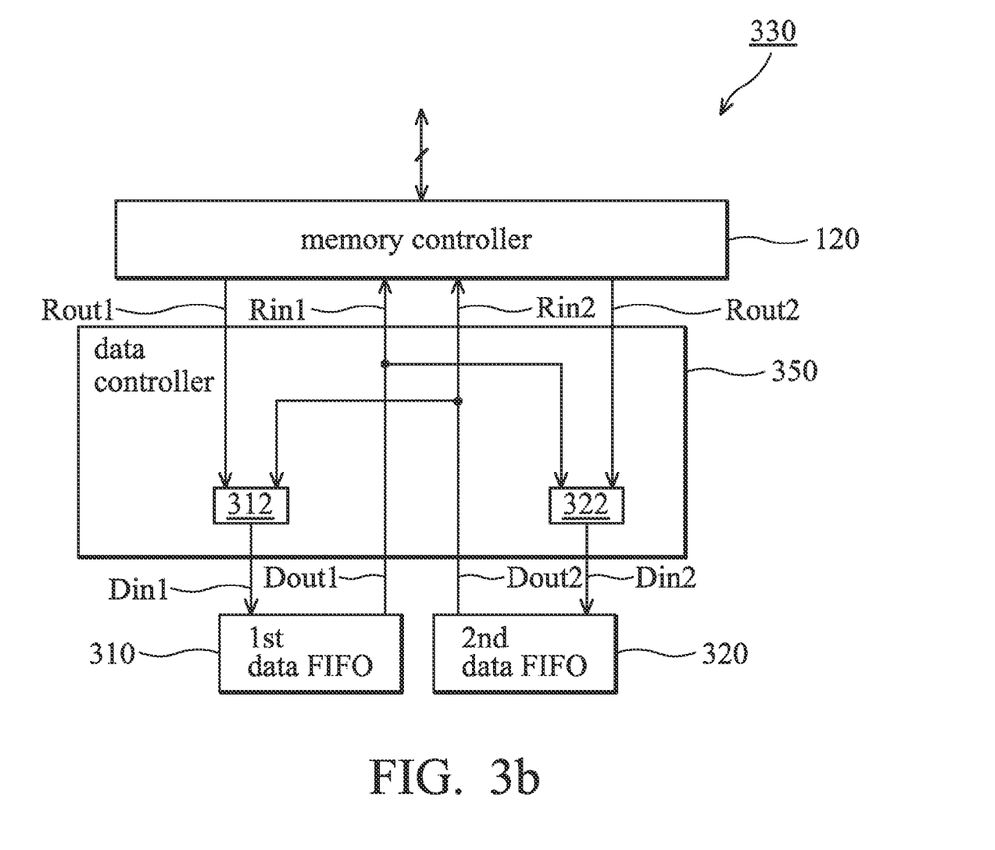

FIG. 3b shows an embodiment of the FIFO controller 330 in the FIFO system 300 according to FIG. 3a. The data controller 350 comprises a first selector 312 and a second selector 322. The first selector 312 is coupled to outputs of the second data FIFO 320 and memory controller 120, selecting one thereof as an input to the first data FIFO 310. Identically, the second selector 322 coupled to outputs of the first data FIFO 310 and memory controller 120 selects one thereof as an input to the first data FIFO 310.

Figure 3C:
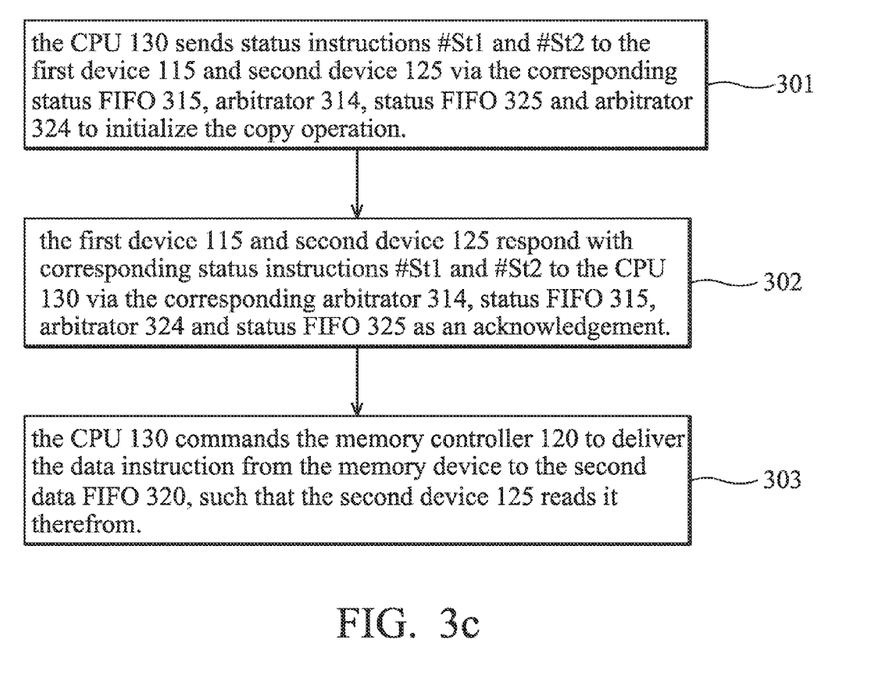

FIG. 3c is a flowchart showing an embodiment of a data reproduction process according to the architecture in FIG. 3a. When data is to be copied from the first device 115 to the second device 125, the data controller 350 provides a direct data path that does not occupy the memory controller 120 or memory device 110. In step 301, When the FIFO system 300 performs a copy operation to copy data from the first device 115 to the second device 125, the CPU 130 sends status instructions #St1 and #St2 to the first device 115 and second device 125 via the corresponding first status FIFO 315, arbitrator 314, second status FIFO 325 and arbitrator 324 to initialize the copy operation. The status instructions are of status type according to IEEE 1394 standard. For example, the CPU 130 initializes a read operation on the first device 115 by SET_RW_REG_ADRS, WRITE_REG and SET_CMD instructions. Simultaneously, the CPU 130 also initializes a write operation on the second device 125 by CMD0, ACMD41, CMD2, CMD3 and CMD7 instructions. In step 302, the first device 115 and second device 125 respond with corresponding status instructions #St1 and #St2 to the CPU 130 via the corresponding arbitrator 314, first status FIFO 315, arbitrator 324 and second status FIFO 325 as an acknowledgement. In step 303, when the acknowledgement is confirmed by the CPU 130, the data requested for copy is transferred. The first device 115 writes the data to the first data FIFO 310 via the arbitrator 314, and the data controller 350 copies the data from the first data FIFO 310 to the second data FIFO 320 as indicated in arrow #D1. The second device 125 then reads the data in the second data FIFO 320 via the arbitrator 324, as indicated in arrow #D2.

Figure 4A:
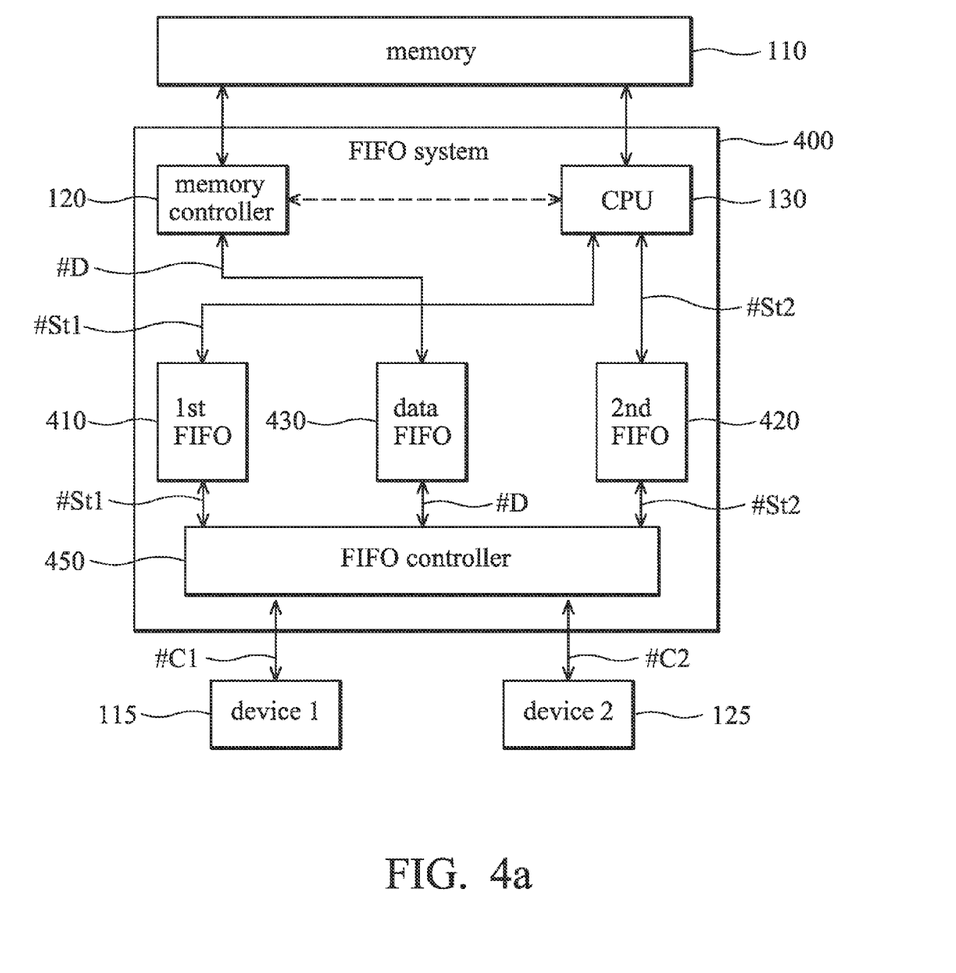
FIG. 4a shows an embodiment of a FIFO system 400 coupled to the first device 115 and second device 125.

FIG. 4a shows an embodiment of a FIFO system 400 coupled to the first device 115 and second device 125. In the FIFO system 400, a first status FIFO 410 serves as an instruction buffer for status transactions #St1 between the first device 115 and the CPU 130, and a second status FIFO 420 serves #St2 between the second device 125 and the CPU 130. A data FIFO 430 is provided as a shared data buffer for data transactions #D for the memory controller 120, first device 115 and second device 125. Since the first device 115 and second device 125 read and write data by control of the status instructions, the data instructions can be commonly stored in the data FIFO 430 without confusion. A FIFO controller 450 is coupled to the first status FIFO 410, second status FIFO 420 and data FIFO 430, multiplexing transactions to and from the first device 115 and second device 125. The FIFO system 400 provides backward compatibility for the first and second devices 115 and 125, because the instructions transactions #C1 and #C2 still follow conventional protocol.

Figure 4B:
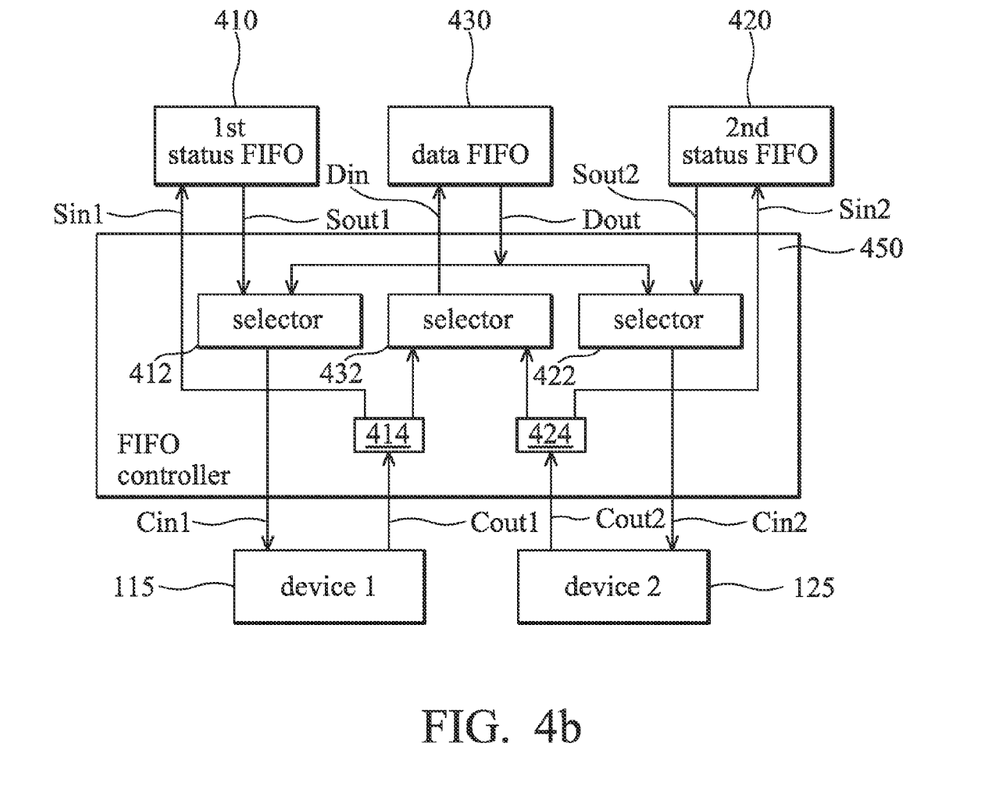

FIG. 4b shows an embodiment of the FIFO controller 450 in the FIFO system 400 according to FIG. 4a. The FIFO controller 450 comprises three selectors and two arbitrators, switching for the data flow, in which a first selector 412 is coupled to the first status FIFO 410 and the data FIFO 430, forwarding output therefrom to the first device 115 as Cin1. A second selector 422 is coupled to the second status FIFO 420 and the data FIFO 430, forwarding output therefrom to the second device 125 as Cin2. A third selector 432 is coupled to the data FIFO 430, forwarding data delivered from the first device 115 and second device 125 bound for the data FIFO 430 as Din. The FIFO controller 450 transparently provides individual data paths from the first status FIFO 410, second status FIFO 420 and data FIFO 430 to the first device 115 and second device 125 operating conventionally, such that no compatibility issues occur. Further in the FIFO controller 450, a first arbitrator 414 is coupled to the third selector 432 and the first status FIFO 410, diverting status instructions from the first device 115 to the first status FIFO 410, and data instructions from the first device 115 to the third selector 432. A second arbitrator 424 is coupled to the third selector 432 and the second status FIFO 420, serving the same for the second device 125.

Figure 4C:
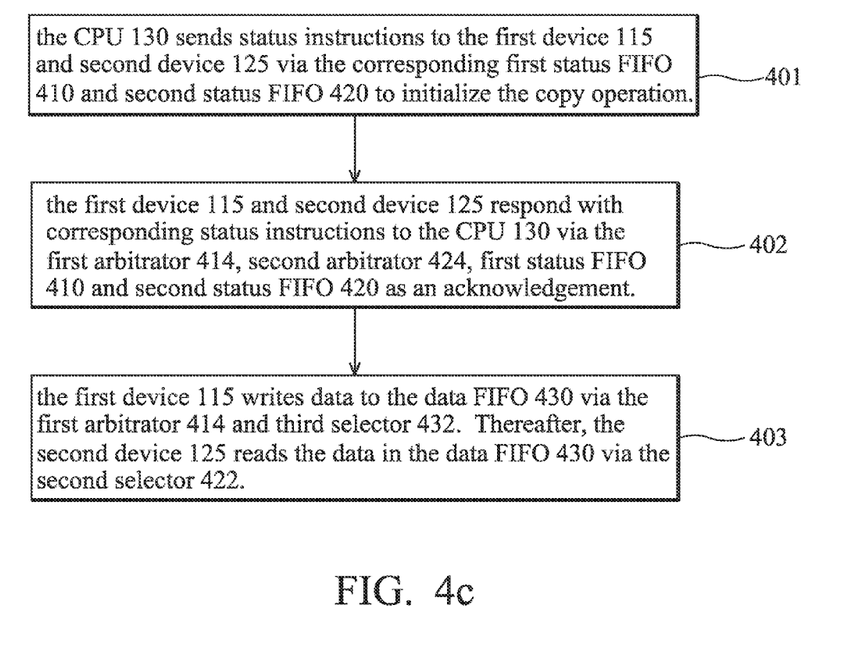

FIG. 4c is a flowchart showing an embodiment of a data reproduction process according to the architecture in FIG. 4a. In step 401, when the FIFO system 400 performs a copy operation to copy data from the first device 115 to the second device 125, the CPU 130 sends status instructions to the first device 115 and second device 125 via the corresponding first status FIFO 410 and second status FIFO 420 to initialize the copy operation. In step 402, the first device 115 and second device 125 respond with corresponding status instructions to the CPU 130 via the first arbitrator 414, second arbitrator 424, first status FIFO 410 and second status FIFO 420 as an acknowledgement. In step 403, when the acknowledgement is confirmed by the CPU 130, the first device 115 writes data to the data FIFO 430 via the first arbitrator 414 and third selector 432. Thereafter, the second device 125 reads the data in the data FIFO 430 via the second selector 422.

Figure 5A:
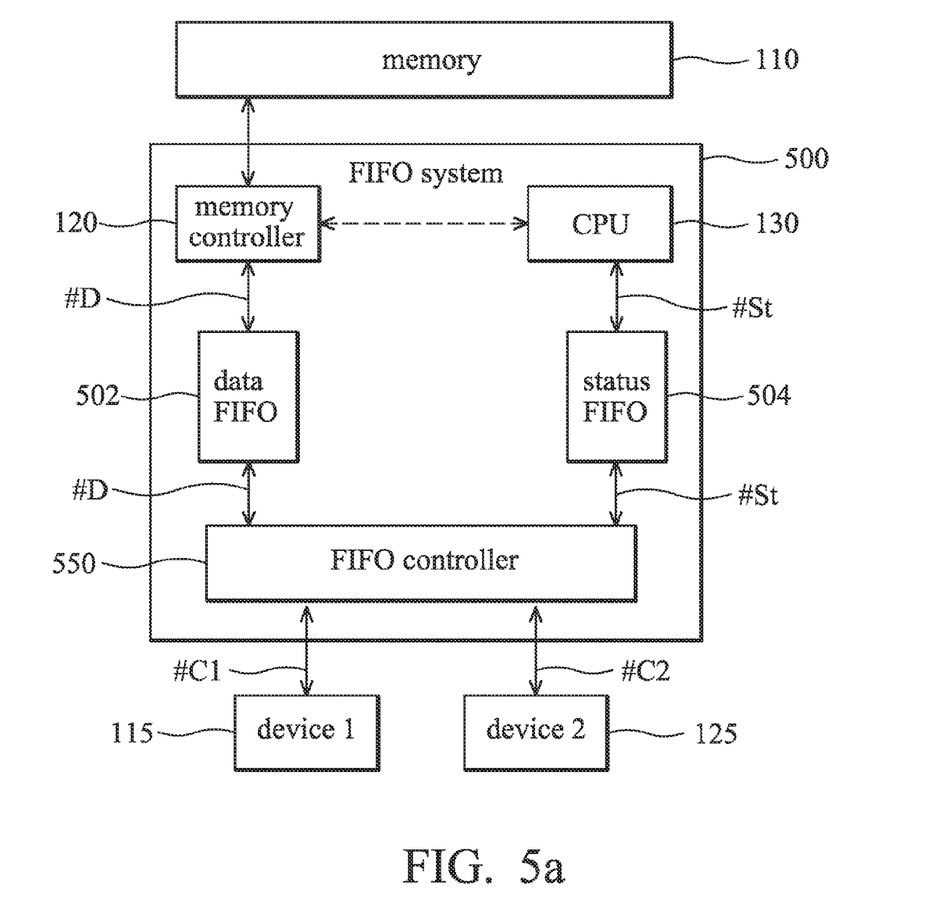
FIG. 5a shows an embodiment of a FIFO system 500 coupled to the first device 115 and second device 125.

FIG. 5a shows an embodiment of a FIFO system 500 coupled to the first device 115 and second device 125. In this embodiment, a data FIFO 502 and a status FIFO 504 are provided. The data FIFO 502 serves as a shared data buffer for all data transactions #D between all devices and the memory controller 120. The status FIFO 504 coupled to the CPU 130, serves as a shared instruction buffer for all status transactions #St between all devices and the CPU 130. To maintain transparency and compatibility for the first device 115 and second device 125, a FIFO controller 550 is provided. The FIFO controller 550 is coupled to the data FIFO 502 and the status FIFO 504, multiplexing data and status transactions #C1 and #C2 to and from the first device 115 and the second device 125.

Figure 5B:
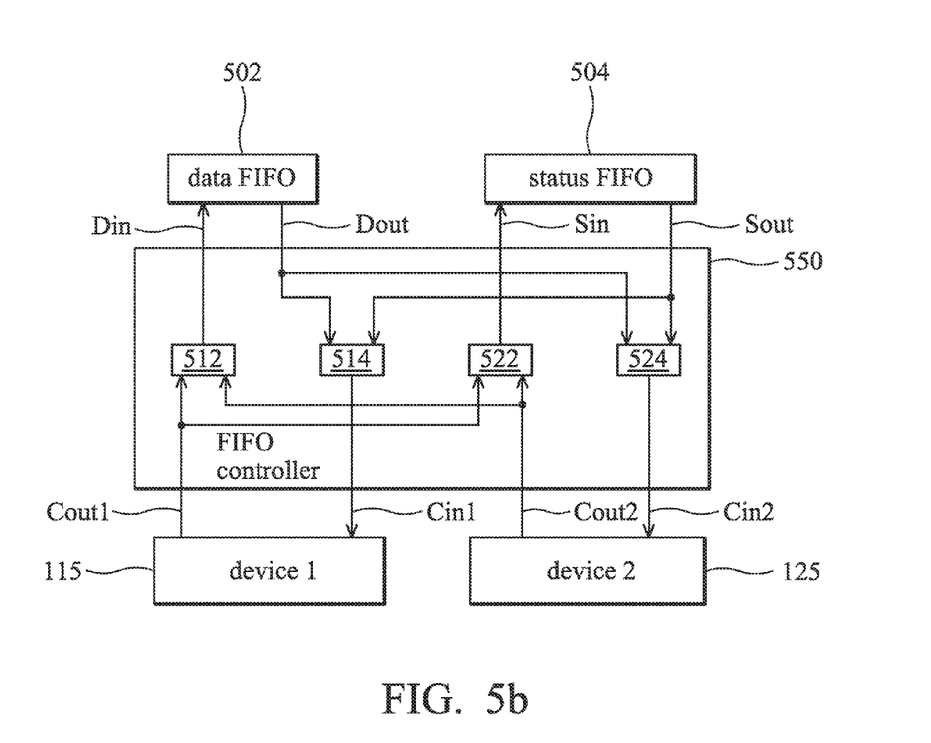

FIG. 5b shows an embodiment of the FIFO controller 550 in the FIFO system 500 according to FIG. 5a. The FIFO controller 550 comprises two arbitrators and two selectors. A first arbitrator 512 is coupled to the data FIFO 502, diverting data output Cout1 and Cout2 from the first device 115 and second device 125 to the data FIFO 502. A first selector 514 is coupled to the data FIFO 502 and status FIFO 504, forwarding output Dout and Sout therefrom to the first device 115. A second arbitrator 522 is coupled to the status FIFO 504, diverting status instructions output from the first device 115 and second device 125 to the status FIFO status FIFO 504. The second selector 524 is coupled to the data FIFO 502 and status FIFO 504, forwarding output Dout and Sout therefrom to the second device 125. When the FIFO system 500 performs a copy operation to copy data from the first device 115 to the second device 125, the CPU 130 sends status instructions to the first device 115 and the second device 125 via the status FIFO 504, first selector 514 and second selector 524 to initialize the copy operation. The first device 115 and second device 125 respond with corresponding status instructions to the CPU 130 via the second arbitrator 522 and status FIFO 504 as an acknowledgement. When the acknowledgement is further confirmed by the CPU 130, the first device 115 writes data to the data FIFO 502 via the first arbitrator 512. Thereafter, the second device 125 reads the data in the data FIFO 502 via the second selector 524. In the embodiment, one data FIFO 502 is shared by all devices, such that implementation of a plurality of data FIFOs for each device is not required, and costs are reduced significantly.

In the disclosed embodiments, the first device 115 and second device 125 are individually a MS card, a SD card, a CF card, or a device conforming IEEE 1394 or USB standards. The FIFO systems described are not limited to serving only two devices at once. On the contrary, a plurality of devices may be coupled together based on the described architecture in FIGS. 3a, 4a and 5a. When a FIFO device is shared by multiple devices, an extra flag is provided to indicate which device a data or status instruction belongs to. The selectors and arbitrators may be specifically designed circuits self-triggered upon reception of a corresponding instruction. The selectors are multiplexing circuits capable of selecting one of two inputs as an output, and the arbitrators are capable of distinguishing instruction types and diverting them accordingly. Alternatively, the selectors and arbitrators may be function blocks implemented by software for control of data flowing in and out the FIFO system.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A First-in-First-Out (FIFO) system, for transferring data between a first device and a second device, wherein the FIFO system is coupled between the first and second devices and a memory device, comprising:
   a CPU, executing status instructions to control data transfer between the first and second devices;
   a first status FIFO, coupled to the first device and the CPU, serving as an instruction buffer for buffering status instructions transferred between the first device and the CPU;
   a second status FIFO, coupled to the second device and the CPU, serving as an instruction buffer for buffering status instructions transferred between the second device and the CPU;
   a data FIFO, serving as a data buffer for buffering data instructions transferred between the first and second devices; and
   a FIFO controller, establishing a bidirectional data path between the first and second devices through the data FIFO;
   wherein the bidirectional data path is a direct data path that does not occupy the memory device, and the first and second devices share the data FIFO in the bidirectional data path,
   wherein the data FIFO is not coupled to the CPU,
   wherein the FIFO controller comprises:
   a first selector coupled between the first status FIFO, the data FIFO and the first device, selectively forwarding an output of the first status FIFO or an output of the data FIFO to the first device;
   a second selector coupled between the second status FIFO, the data FIFO and the second device, selectively forwarding an output of the second status FIFO or the output of the data FIFO to the second device; and
   a third selector coupled between the data FIFO and the first and second devices, selectively forwarding data instructions from the first device or data instructions from the second device to the data FIFO.

2. The FIFO system as claimed in claim 1, wherein the FIFO controller further comprises:
   a first arbitrator, coupled to the third selector and the first status FIFO, diverting status instructions from the first device to the first status FIFO, and diverting data instructions from the first device to the third selector; and a second arbitrator, coupled to the third selector and the second status FIFO, diverting status instructions from the second device to the second status FIFO, and diverting data instructions from the second device to the third selector.

3. The FIFO system as claimed in claim 2, wherein when the FIFO system performs a copy operation to copy data from the first device to the second device:
the CPU sends status instructions to the first and second devices via the corresponding first status FIFO and second status FIFO to initialize the copy operation;
the first and second devices return status instructions to the CPU via the corresponding first arbitrator, second arbitrator, first status FIFO and second status FIFO as an acknowledgement;
the first device writes data instructions to the data FIFO via the first arbitrator and third selector; and
the second device reads the data instructions in the data FIFO via the second selector.

4. The FIFO system as claimed in claim 1, wherein the first and second devices are of the same type conforming to IEEE 1394 or USB standards.

5. The FIFO system as claimed in claim 1, wherein the first and second devices are different types conforming to IEEE 1394 or USB standards.

6. The FIFO system as claimed in claim 1, wherein the first and second devices are individually a MS card, a SD card or a CF card.

7. A FIFO operating method for transferring data between a first device and a second device via the FIFO system as claimed in claim 1, comprising:
the CPU sending status instructions to the first and second devices via the corresponding first status FIFO and second status FIFO to initialize a copy operation;
the first and second devices, in response, respectively sending status instructions to the CPU via the first status FIFO and second status FIFO as an acknowledgement;
the first device writing at least one data instruction to the data FIFO; and
the second device reading the data instruction in the data FIFO.

* * * * *